United States Patent [19]

Neuenschwander

[11] 4,064,599
[45] Dec. 27, 1977

[54] FIBERIZING METHOD AND APPARATUS EMPLOYING DIFFERENTIAL FEED SYSTEM

[75] Inventor: Rudolf Neuenschwander, Swarthmore, Pa.

[73] Assignee: Scott Paper Company, Philadelphia, Pa.

[21] Appl. No.: 586,606

[22] Filed: June 13, 1975

[51] Int. Cl.² ............................................. D01G 23/00
[52] U.S. Cl. ...................................... 19/96; 19/145.7; 19/156.3
[58] Field of Search ...................... 19/105, 145.7, 145.5, 19/97.5, 156–156.4, 96, 155; 156/62.2, 62.4, 62.6; 264/115, 121, 10

[56] References Cited

U.S. PATENT DOCUMENTS

| | | | |
|---|---|---|---|
| 852,474 | 5/1907 | Tyden | 19/145.5 |
| 1,759,260 | 5/1930 | Hoffmann | 19/145.7 |
| 2,152,901 | 4/1939 | Manning | 19/156.4 X |
| 2,336,745 | 12/1943 | Manning | 264/10 |
| 3,126,584 | 3/1964 | Pearson | 19/156.3 X |
| 3,239,888 | 3/1966 | Diesel | 19/145.5 X |
| 3,268,954 | 8/1966 | Joa | 19/156.3 |
| 3,648,330 | 3/1972 | Binder et al. | 19/145.5 |

FOREIGN PATENT DOCUMENTS

| | | | |
|---|---|---|---|
| 67,883 | 7/1969 | Germany | 19/145.5 |
| 199,485 | 6/1923 | United Kingdom | 19/97.5 |

*Primary Examiner*—Dorsey Newton
*Attorney, Agent, or Firm*—Martin L. Faigus; William J. Foley

[57] ABSTRACT

Method and apparatus for separating fibers from a stack of fibrous sheets, either in roll or bale form, by directing the stack of sheets into engagement with a fiberizing means employs a differential feed system for directing the bottom sheet, or sheets, of the stack into engagement with the fiberizing means at a different speed relative to other sheets of the stack. Preferably the bottom sheet of the stack is fed into the fiberizing means at a slower speed relative to other sheets of the stack to minimize clump generation in the fiberizing operation.

11 Claims, 1 Drawing Figure

U.S. Patent  Dec. 27, 1977  4,064,599
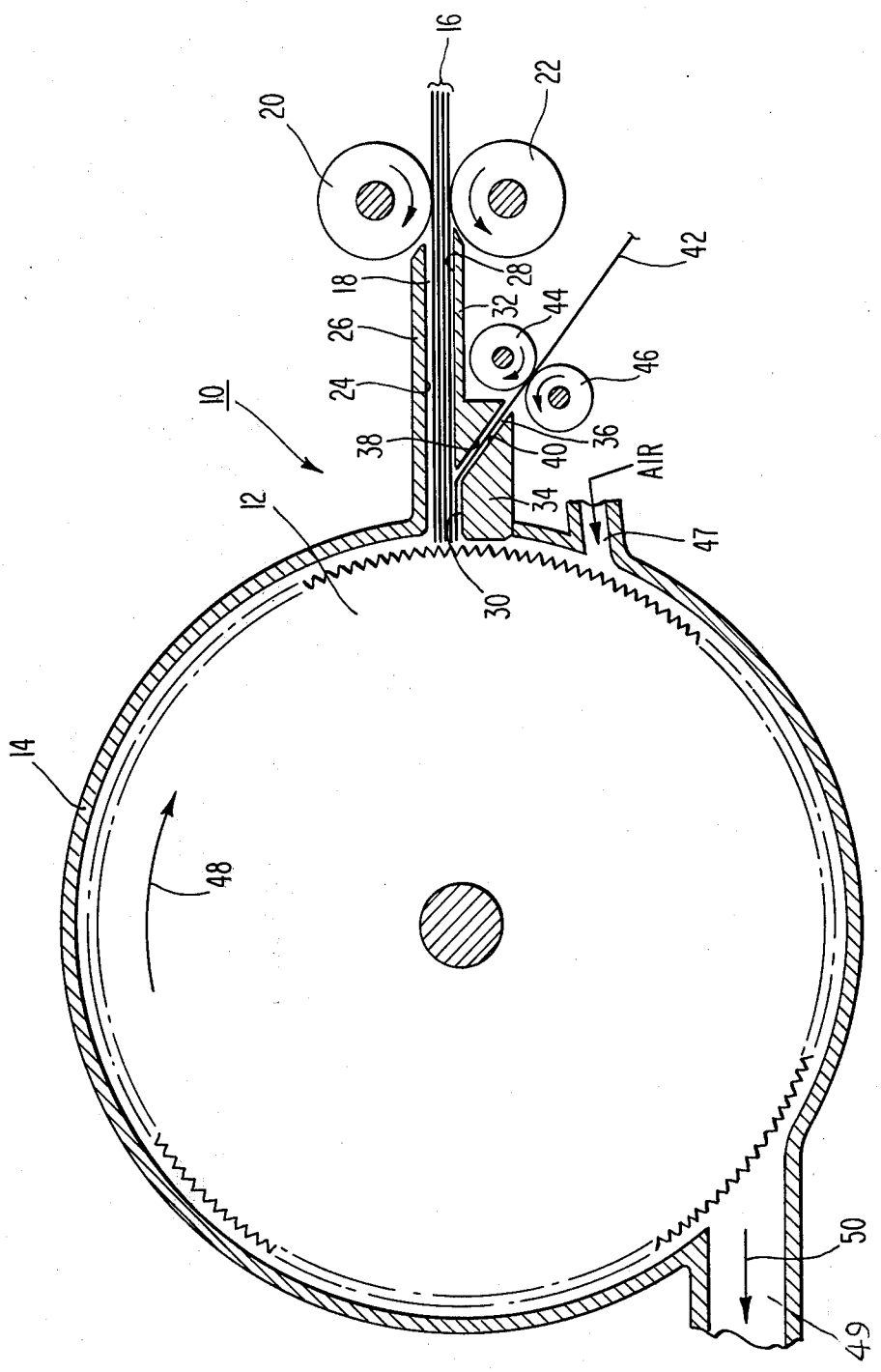

FIBERIZING METHOD AND APPARATUS EMPLOYING DIFFERENTIAL FEED SYSTEM

BACKGROUND OF THE INVENTION

1. Field of the Invention

This invention relates to method and apparatus for separating fibers from a stack of fibrous sheets in a manner which controls clump generation during the fiberizing operation. The term "clump" or "clumps", as used throughout this application, refers, respectively, to a relatively dense group, or groups of intertangled fibers which are separated from the sheets.

2. Description of the Prior Art

Dry-formed fibrous webs or batts including a large percentage by weight of wood pulp fibers are well known in the prior art. These webs or batts are formed by conveying the fibers in an air stream and depositing them in a randomly arranged and intermingled fashion on a forming surface. For some uses, such as wipers and cover sheets for sanitary products, the strength and integrity of the web is enhanced by including a minor proportion, i. e., up to about 25% by weight, of longer, staple-length fibers therein, and by adhesively bonding the fibers together. For other uses, such as internal absorbent components of sanitary products, unbonded fibrous batts including 100% wood pulp fibers have been satisfactorily employed.

Fibrous webs which are exposed to view during use, e.g. wipers and cover sheets for sanitary products, should have a substantially uniform basis weight distribution and should be relatively free of unsightly fiber clumps. Moreover, fiber clumps are often deposited on the web surface, and are not adequately bonded into the web structure. When the web is used in wiping applications the clumps separate from the web, and thereby contaminate the surface being wiped. For used in which the web or batt is not exposed to view, e.g. internal absorbent component of a sanitary napkin or disposable diaper, the presense of fiber clumps may not be detrimental. In fact, it may be desirable to actually include a predetermined quantity of fiber clumps in the batt to enhance wickability.

As part of the web or batt formation process it is common to employ a fiberizing device for separating individual fibers from a stack of wet-pressed and dried densified pulp lap sheets, and directing the separated fibers in an air stream onto a foraminous forming surface. One popular fiberizing device which is commonly employed for this purpose is the Joa Fiberizer, manufactured by Joa, Inc. of North Wales, Fla. Fiberizers of the Joa-type include a rotating fiberizing roll having pins or teeth disposed about the outer periphery thereof, and the stack of sheet is directed into the fiberizing roll over a supporting surface of a nose bar. If the spacing between the nose bar and the fiberizing roll is too large the sheets tend to bend or flex when engaged by the fiberizing roll, rather than being separated into its individual fiber components. Eventually the flexed sections of the sheet are separated, or severed in the form of dense units of intertangled fibers, (i.e. clumps) rather than being separated into individual fibers. It has been suggested in the prior art to move the nose bar extremely close to the fiberizing roll to aid in minimizing the generation of clumps. Although clump formation is minimized in this manner, the individual fibers within the sheet tend to be excessively damaged as they are separated by the fiberizing roll. Specifically, the individual fibers are shredded into small fines or dust, rather than being separated in an undamaged state. The fines and dust generally are undesirable in fibrous webs or batts which are formed from the separated fibers.

In prior art fiberizing devices of the Joa-type a trade-off exists between forming an excessive quantity of clumps or excessively damaging fibers. A gap between the nose bar and fiberizing roll which is sufficiently large to minimize fiber damage generally results in the excessive generation of clumps, and a gap which is sufficiently small to minimize the generation of clumps generally results in excessive damage to the individual fibers.

As indicated earlier, for some end use applications, such as internal absorbent components of sanitary products, it may be desirable to actually include a predetermined quantity of fiber clumps in the batt to establish the desired wicking capabilities therein. To the best of applicant's knowledge there is no prior art teachings directed to establishing a predetermined level of clump formation in dry-formed fibrous webs or batts.

SUMMARY OF THE INVENTION

Applicant has discovered that in fiberizing a stack of fibrous sheets, such as wet-pressed and dried pulp lap sheets, the bottom sheet of the stack is the major contributor of clumps. In other words, the bottom sheet is the one which is most prone to becoming separated in the form of clumps, rather than as individual fibers. It is believed that the propensity for clump formation in the bottom lap results from the fact that the bottom lap tends to bend around the downstream end of the nose bar when it is initially acted upon by the fiberizing roll, as opposed to becoming separated into individual fibers. Subsequently, the bent portion of the bottom lap will be separated in the form of fiber clumps. It is believed that this bottom lap acts as a support for the remaining sheets in the stack to prevent them from being excessively flexed or bent by their interaction with the fiberizing roll.

Predicated upon the above discovery applicant has invented a method and apparatus which employs a differential feed system for directing sheets in a stacked condition at different speeds relative to each other into a fiberizing means for controlling the generation of clumps in the fiberizing operation. In a preferred embodiment of this invention a bottom sheet of the stack is directed into engagement with a rotating fiberizing means at a different speed relative to other sheets of the stack to control clump generation. In the most preferred embodiment of this invention the bottom sheet is directed at a considerably slower speed than the remaining sheets of the stack so as to greatly reduced the amount of clumps which are ultimately included in a web or batt formed from the suspension of fibers generated in the fiberizing operation.

Reference to "bottom" sheet refers to the sheet in the stack that is last engaged by the fiberizing means. Accordingly, when the fiberizing means is a rotating roll having teeth disposed about its outer periphery, the direction of rotation of the fiberizing roll dictates the sheet of the stack which will constitute the "bottom" sheet. The bottom sheet is generally the one which is supported on a nose bar, or other support, as it is directed into engagement with the fiberizing means.

Other objects and advantages of this invention will become apparent upon reading the description which follows, taken in conjunction with the drawing.

BRIEF DESCRIPTION OF THE DRAWING

The drawing is a schematic sectional view of a fiberizing apparatus employed in accordance with this invention.

DESCRIPTION OF THE PREFERRED EMBODIMENT OF THE INVENTION

Referring to the drawing, a fiberizing device 10 in accordance with this invention includes a rotatable fiberizing roll 12, which can be driven by any suitable drive means (not shown), supported within a housing 14. The fiberizing roll 12 includes a plurality of projections, such as teeth or pins, about its outer periphery for separating fibers from sheets of fibrous material. A main stack of fibrous sheets 16 (either in roll or bale form), preferably in the form of wet-pressed and dried pulp laps, is directed through a confining channel 18 by a pair of positively driven feed rolls 20 and 22. The confining channel 18 is defined by a lower surface 24 of a top plate 26, and upper surfaces 28 and 30 of a feed table 32 and nose bar 34, respectively. A second channel 36 is defined between confronting surfaces 38 and 40 of the feed table 32 and nose bar 34, respectively. This second channel 36 is disposed at an acute angle to the main channel 18, and communicates with said main channel upstream of the fiberizing roll 12. The channel 36 acts as a guide for a fibrous sheet 42 which is directed by a pair of positively driven feed rolls 44 and 46 into engagement with the bottom of the main stack of sheets 16.

The speed of the stack of sheets 16 directed through the main channel 18 is controlled by the feed rolls 20 and 22, and the speed of the sheet 42 is controlled by the feed rolls 44 and 46. In accordance with a preferred operation of this invention the stack of sheets 16 is directed into engagement with the teeth of the fiberizing roll 12 at a considerably greater speed than the sheet 42. As can be seen in the drawing, the sheet 42 is part of the stack as it is directed into engagement with the teeth of the fiberizing roll 12.

As the fibers are separated from the stack of sheets they are entrained in air which enters the housing 14 through a passageway 47. The air suspension of fibers is then conveyed about the roll in the direction of its rotation, as indicated by arrow 48, and exits through an outlet passageway 49 in the direction indicated by arrow 50. The fiberizing device 10 can be connected to subsequent downstream web-forming equipment, or can be utilized by itself to form a fibrous web by closing the downstream end of passageway 49 with an air-pervious forming surface (not shown). In the latter case, a vacuum box (not shown) generally is positioned beneath the forming surface to pull the air of the suspension through the surface and deposit the fibers on the surface in the form of a web.

Applicant has discovered that in fiberizing a stack of fibrous sheets, such as wet-pressed and dried pulp lap sheets, the bottom sheet of the stack is the major contributor of clumps. In other words, the bottom sheet is the one which is most prone to being separated into clumps, rather than into individual fibers. In accordance with a preferred method of this invention applicant has greatly minimized the generation of clumps in the fiberizing operation by feeding the bottom sheet 42 into the fiberizing roll 12 at a considerably slower speed than the main stack of fibrous sheets 16. In this manner the bottom sheet 42 provides a considerably lower contribution to the total fiber weight within the air suspension of fibers than would be the case if it were fed at the same, or greater speed than the main stack. Since the bottom sheet 42 is the major contributor to clump formation, its lower contribution to the total fiber weight within the air suspension of fibers also results in a lower contribution of clumps in the air stream. The present invention permits the establishment of a sufficiently large gap between the fiberizing roll 12 and nose bar 34 to minimize fiber damage while at the same time minimizing the generation of clumps.

In accordance with an exemplary mode of operation of the device 10, the main stack of sheets 16 is directed into the fiberizing roll 12 at a speed about thirty times greater than that of the bottom sheet 42. For example, satisfactory operation has been achieved by directing the stack of sheets 16 into the fiberizing roll 12 at a speed of about 6 feet per minute, and by directing the fibrous sheet 42 into the fiberizing roll, as part of the stack, at a speed of about 2.5 inches per minute. These speeds are not considered to be a limitation on the present invention, it being understood that people skilled in the art can easily vary the speeds to achieve a desired, or tolerable level of clump generation in the fiberizing operation.

The number of sheets which are directed in stacked relationship through the confining channel 18 can be varied within wide limits. In accordance with the broadest aspect of this invention only a single sheet 16 can be directed through the confining channel 18; however, this mode of operation may not be very practical.

Also, it is within the scope of this invention to feed more than one fibrous sheet through channel 36 into engagement with the bottom of the stack of sheets 16. The important criteria for controlling the level of clump generation is to feed at least the bottom sheet of the stack into the fiberizing roll at a lower speed than other sheets of the stack.

It is believed that the present method and apparatus of this invention has broader applications than reducing the generation of clumps in a fiberizing operation. Specifically, it is believed that the differential feed system of this invention can be employed to control generation in a fiberizing operation to establish a desired level of fiber clumps. For example, when forming a loosely compacted fluff batt for use as an internal absorbent component in a sanitary product, it may be desirable to include a predetermined quantity of fiber clumps in the batt. Applicant's invention is believed to be applicable for achieving such a result by properly selecting an appropiate speed ratio between the bottom sheet in the stack and other sheets in the stack.

Having described my invention, I claim:

1. A method for separating fibers from a stack of fibrous sheets by directing the stack of sheets into engagement with a rotating fiberizing means; the improvement comprising the steps of directing a first stack of sheets at a first speed in a downstream direction into engagement with said fiberizing means and directing at least one additional sheet at a second speed different from said first speed into engagement with the bottom of said first stack upstream of the fiberizing means and then, as part of said stack, into engagement with said fiberizing means.

2. An apparatus for separating fibers from a stack of fibrous sheets, said apparatus comprising:

a. a housing;

b. a fiberizing means within said housing for engaging a stack of fibrous sheets to separate fibers therefrom;
c. a first guide means having a downstream end communicating with the interior of said housing for guiding at least one fibrous sheet into engagement with said fiberizing means;
d. a first feed means for controlling the speed at which said at least one fibrous sheet is directed into engagement with said fiberizing means;
e. a second guide means having a downstream end communicating with said first guide means upstream of said fiberizing means for guiding at least one other sheet into stacked relationship with said at least one fibrous sheet upstream of said fiberizing means;
f. second feed means for controlling the speed at which said at least one other fibrous sheet is directed along said second guide means, said first guide means and into said fiberizing means;
g. said first and second guide means each including opposed surfaces defining an elongate channel, one channel being disposed at an acute angle beneath the other channel having a downstream end communicating with said other channel upstream of said fiberizing means.

3. The apparatus according to claim 2, wherein said fiberizing means includes a rotatably mounted roll having a plurality of fiberizing projections on the outer periphery thereof.

4. The apparatus according to claim 2, wherein said first feed means and second feed means each include opposed driven surfaces defining a feed nip for engaging fibrous sheets and directing them into the fiberizing means through said one channel and said other channel, respectively.

5. A method of controlling the generation of fibrous clumps during the separation of fibers from a stack of fibrous sheets, said stack including a bottom sheet that is engaged and supported by a stationary surface positioned close to a rotating fiberizing roll having projections about its outer periphery; the improvement comprising the step of directing the bottom sheet of the stack into engagement with the projections of the rotating fiberizing roll at a different speed relative to a plurality of other sheets of the stack to thereby control the generation of clumps during the fiber separating operation.

6. The method according to claim 5, including the step of employing a first feed means for controlling the speed at which said bottom sheet is directed into engagement with the projections and a second feed means for controlling the speed at which said plurality of other sheet is directed into engagement with the projections.

7. The method according to claim 5, including the step of directing the bottom sheet into engagement with the projections on said fiberizing roll at a slower speed than that at which said plurality of other sheets is directed into engagement with the projections on said fiberizing roll to thereby minimize the generation of clumps during the fiber separating operation.

8. The method according to claim 7, wherein the sheets of the stack are wet-pressed and dried pulp laps.

9. The method according to claim 5, wherein the sheets of the stack are wet-pressed and dried pulp laps.

10. A method of controlling the generation of fibrous clumps during the separation of fibers from a stack including pulp lap sheets by directing the stack into engagement with a rotating fiberizing means; the improvement comprising the steps of directing a first stack including pulp lap sheets at a first speed in a downstream direction into engagement with said fiberizing means and directing at least one additional pulp lap sheet at a second speed different from said first speed into engagement with the bottom of said first stack upstream of the fiberizing means and then, as part of said stack, into engagement with said fiberizing means to thereby control the generation of clumps of pulp during the fiber separating operation.

11. The method according to claim 10, including the step of directing said at least one additional pulp lap sheet into engagement with the rotating fiberizing means at a slower speed than the pulp lap sheets in the first stack to minimize clump generation.

* * * * *